(12) United States Patent
Wittig et al.

(10) Patent No.: US 11,216,204 B2
(45) Date of Patent: Jan. 4, 2022

(54) DEGRADED REDUNDANT METADATA, DRUM, TECHNIQUE

(71) Applicant: NetApp, Inc., Sunnyvale, CA (US)

(72) Inventors: James Philip Wittig, Boulder, CO (US); Jared Cantwell, Boulder, CO (US); Mark Olson, Longmont, CO (US)

(73) Assignee: NetApp, Inc., San Jose, CA (US)

(*) Notice: Subject to any disclaimer, the term of this patent is extended or adjusted under 35 U.S.C. 154(b) by 63 days.

(21) Appl. No.: 16/688,556

(22) Filed: Nov. 19, 2019

(65) Prior Publication Data
US 2021/0149566 A1 May 20, 2021

(51) Int. Cl.
*G06F 3/06* (2006.01)
(52) U.S. Cl.
CPC .............. *G06F 3/065* (2013.01); *G06F 3/067* (2013.01); *G06F 3/0619* (2013.01)
(58) Field of Classification Search
CPC ......... G06F 3/065; G06F 3/067; G06F 3/0619
USPC ........................................................ 711/162
See application file for complete search history.

(56) References Cited

U.S. PATENT DOCUMENTS

| | | | |
|---|---|---|---|
| 7,543,017 B1* | 6/2009 | Roush | G06F 15/16 709/202 |
| 9,383,933 B2 | 7/2016 | Wright | |
| 2003/0217030 A1* | 11/2003 | Byrne | G06F 11/2033 |
| 2013/0227145 A1 | 8/2013 | Wright et al. | |
| 2014/0351363 A1* | 11/2014 | Wright | G06F 15/173 709/213 |
| 2015/0244795 A1* | 8/2015 | Cantwell | G06F 16/27 709/202 |

* cited by examiner

*Primary Examiner* — Than Nguyen
(74) *Attorney, Agent, or Firm* — Jaffery Watson Mendonsa & Hamilton LLP

(57) ABSTRACT

A technique maintains multiple copies of data served by storage nodes of a cluster during upgrade of a storage node to ensure continuous protection of the data served by the nodes. The data is logically organized as one or more volumes on storage devices of the cluster and includes metadata that describe the data of each volume. A data protection system may be configured to maintain two copies of the data in the cluster during upgrade to a storage node that is assigned to host one of the copies of the data but that is taken offline during the upgrade. As a result, a slice service of the node may become unavailable during the upgrade. In response to the unavailability of the slice service, the technique redirects replicated data targeted to the slice service to a standby slice service according to a degraded redundant metadata (DRuM) service of the cluster.

20 Claims, 6 Drawing Sheets

DEGRADED REDUNDANT METADATA, DRUM, TECHNIQUE

BACKGROUND

Technical Field

The present disclosure relates to protection of data served by storage nodes of a cluster and, more specifically, to ensuring continuous protection of data served by the storage nodes of the cluster.

Background Information

A plurality of storage nodes organized as a cluster may provide a distributed storage architecture configured to service storage requests issued by one or more clients of the cluster. The storage requests are directed to data stored on storage devices coupled to one or more of the storage nodes of the cluster. The data served by the storage nodes may be distributed across multiple storage units embodied as persistent storage devices, such as hard disk drives, solid state drives, flash memory systems, or other storage devices. The storage nodes may logically organize the data stored on the devices as volumes accessible as logical units. Each volume may be implemented as a set of data structures, such as data blocks that store data for the volume and metadata blocks that describe the data of the volume. For example, the metadata may describe, e.g., identify, storage locations on the devices for the data. The data of each volume may be divided into data blocks. The data blocks may be distributed in a content driven manner throughout the nodes of the cluster so as to even out storage utilization and input/output load across the cluster. To support increased durability of data, the data blocks may be replicated among the storage nodes.

To further improve storage capacity, data redundancy as provided by a data protection system (DPS) may be employed. A typical DPS implemented by a cluster is data replication, wherein multiple copies (e.g., two copies) of data may be hosted by storage nodes of the cluster. During upgrade to a storage node in the cluster, the node is taken offline and, thus, is unable to serve (i.e., host) a copy of the data. Accordingly, data received at the cluster may not be replicated at the upgraded node resulting in only one copy of the data served by the cluster. As a result, the cluster is exposed to loss of data if there is a failure to the remaining node hosting the single copy of the data.

A possible approach to this existing problem involves transfer of data from the storage node being upgraded to another node of the cluster. However this approach is costly in terms of time and bandwidth due to a possible substantial amount of data migration, thus complicating the upgrade effort.

BRIEF DESCRIPTION OF THE DRAWINGS

The above and further advantages of the embodiments herein may be better understood by referring to the following description in conjunction with the accompanying drawings in which like reference numerals indicate identically or functionally similar elements, of which.

OVERVIEW

Figure 1:
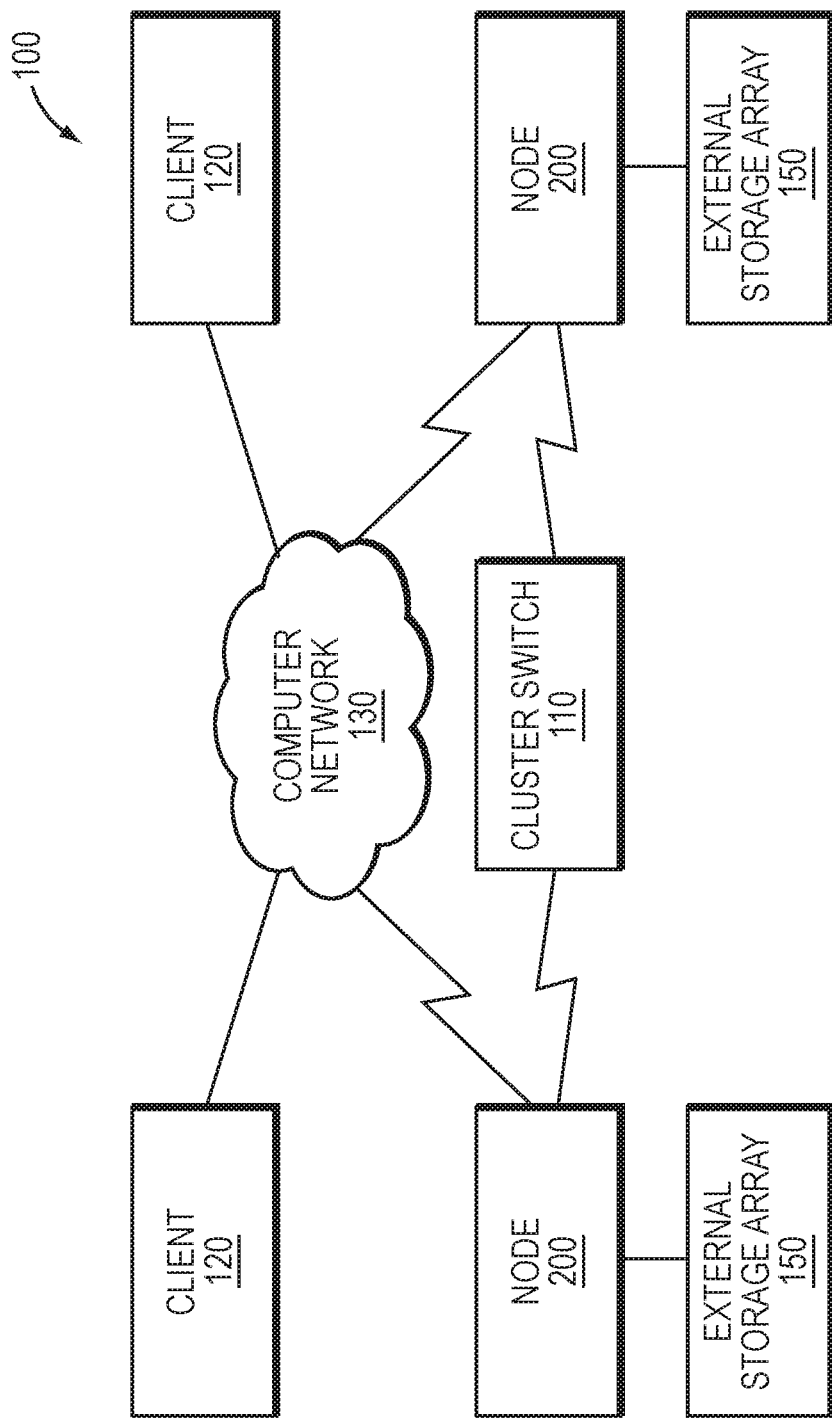
FIG. 1 is a block diagram of a plurality of storage nodes interconnected as a cluster.

The embodiments described herein are directed to a degraded redundant metadata (DRuM) technique configured to maintain multiple copies of data for storage nodes of a cluster, e.g., during upgrade of a storage node, to ensure continuous protection of the data served by the nodes. The data is logically organized as one or more volumes on storage devices of the cluster and includes metadata that describe the data of each volume. Nodes of the cluster provide slice services that present client facing tasks that initially store the data and metadata for eventual synchronization to back-end block services (i.e., data at rest) also hosted on the nodes. The cluster may be configured to maintain primary and secondary slice services such that the secondary slice service includes a copy of the initial data and thus can failover in the event that the primary slice service is unavailable. Illustratively, a data protection system (DPS) may be configured to maintain two copies (first and second copies) of the data in the cluster during upgrade of a storage node that is assigned to store one of the copies of the data but that is taken offline during the upgrade. As a result, an original slice service (SS), e.g., the secondary SS, of the secondary node may become unavailable during the upgrade. Accordingly, failover of the remaining SS, e.g., the primary SS, becomes impossible, leaving initially stored data vulnerable to loss. In response to the unavailability of the original SS, the technique redirects the initial storage of data received at (i.e., targeted to) the original SS to a standby SS in accordance with a DRuM service of the cluster. Note that unavailability of the primary SS may result in promotion of the secondary SS as the primary SS.

In an embodiment, the standby SS receives no data until the upgrade, at which is time it receives only new incoming data received at the cluster after the original SS is unavailable, i.e., brought offline. Note that the data received by the standby SS is not the entire copy (second copy) of data for the volume unlike the failover (e.g., secondary) SS, but rather only the new incoming write data of the second copy after the original SS is brought offline, e.g., as a result of a failure or upgrade. This new incoming data of the second copy may be combined with (added to) the existing data of the second copy maintained by the original SS (i.e., the failed primary or secondary SS) in order to form a complete, valid second copy of the data. That is, the data received by the standby SS includes only new incoming portions of the replicated (i.e., second copy) data received at the cluster during downtime of the storage node (e.g., during upgrade). Accordingly, ordering of the data is significant as is the union of the existing copy portion of the data stored at the original SS and the new incoming copy portion of the data stored at the standby SS.

Advantageously, the DRuM technique ensures that there are multiple full (complete) copies of data at all times (i.e., initial store of data and at rest) in accordance with the DPS, despite the fact that portions of those copies may be distributed across multiple storage nodes. The DRuM technique allows rebuilding of the data from the distributed portions with no data loss to thereby ensure that at least one complete copy of the data is useable at any given time.

DESCRIPTION

Storage Cluster

FIG. 1 is a block diagram of a plurality of storage nodes 200 interconnected as a storage cluster 100 and configured to provide storage service for information, i.e., data and metadata, organized and stored on storage devices of the cluster. The storage nodes 200 may be interconnected by a cluster switch 110 and include functional components that cooperate to provide a distributed, scale-out storage architecture of the cluster 100. The components of each storage node 200 include hardware and software functionality that enable the node to connect to and service one or more clients 120 over a computer network 130, as well as to an external storage array 150 of storage devices, to thereby render the storage service in accordance with the distributed storage architecture.

Each client 120 may be embodied as a general-purpose computer configured to interact with the storage node 200 in accordance with a client/server model of information delivery. That is, the client 120 may request the services of the storage node 200, and the node may return the results of the services requested by the client, by exchanging packets over the network 130. The client may issue packets including file-based access protocols, such as the Network File System (NFS) and Common Internet File System (CIFS) protocols over the Transmission Control Protocol/Internet Protocol (TCP/IP), when accessing information on the storage node in the form of storage objects, such as files and directories. However, in an embodiment, the client 120 illustratively issues packets including block-based access protocols, such as the Small Computer Systems Interface (SCSI) protocol encapsulated over TCP (iSCSI) and SCSI encapsulated over Fibre Channel (FCP), when accessing information in the form of storage objects such as logical units (LUNs).

Figure 2:
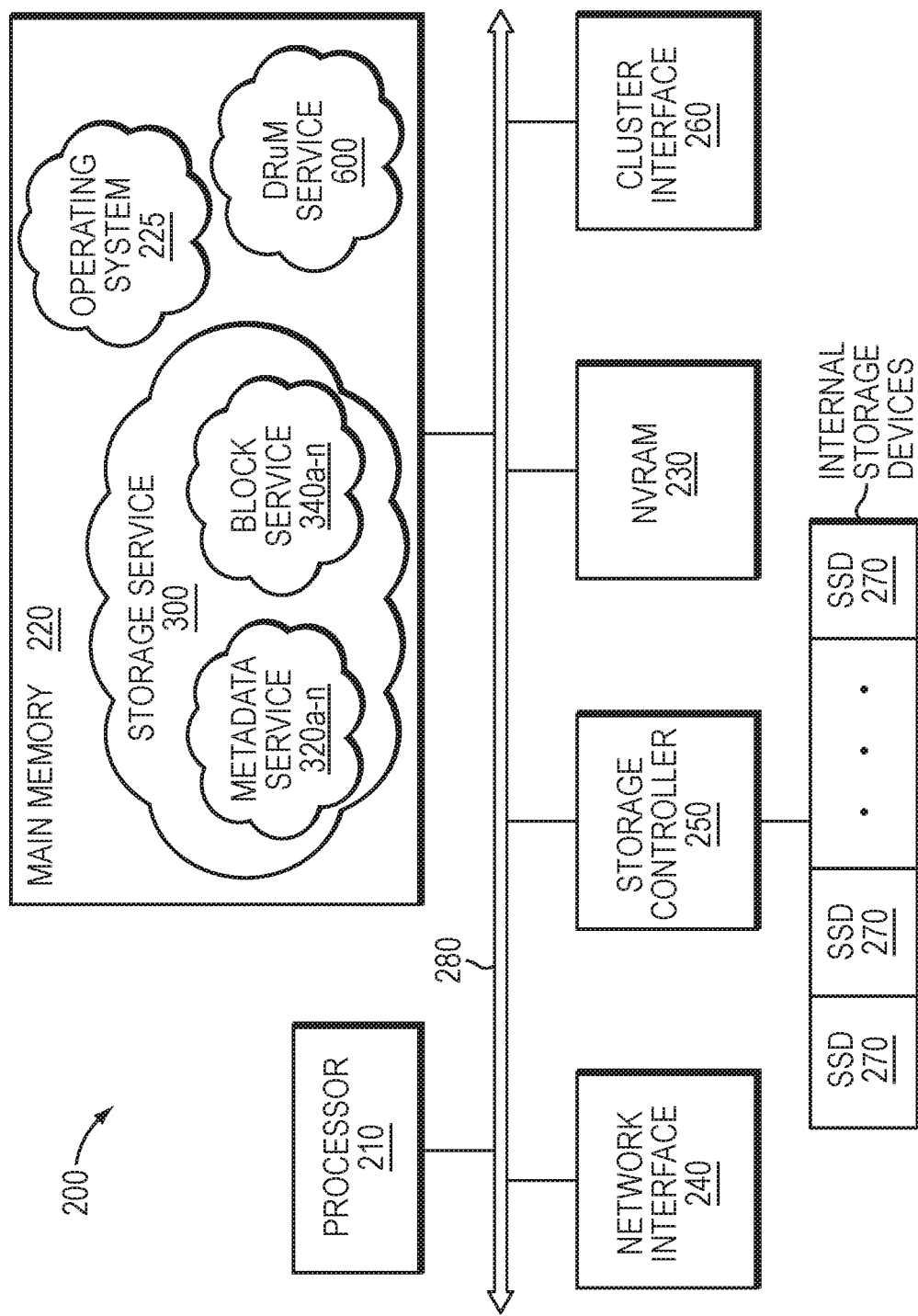
FIG. 2 is a block diagram of a storage node.

FIG. 2 is a block diagram of storage node 200 illustratively embodied as a computer system having one or more processing units (processors) 210, a main memory 220, a non-volatile random access memory (NVRAM) 230, a network interface 240, one or more storage controllers 250 and a cluster interface 260 interconnected by a system bus 280. The network interface 240 may include one or more ports adapted to couple the storage node 200 to the client(s) 120 over computer network 130, which may include point-to-point links, wide area networks, virtual private networks implemented over a public network (Internet) or a shared local area network. The network interface 240 thus includes the mechanical, electrical and signaling circuitry needed to connect the storage node to the network 130, which may embody an Ethernet or Fibre Channel (FC) network.

The main memory 220 may include memory locations that are addressable by the processor 210 for storing software programs and data structures associated with the embodiments described herein. The processor 210 may, in turn, include processing elements and/or logic circuitry configured to execute the software programs, such as one or more metadata services 320*a-n* and block services 340*a-n* of storage service 300 as well as a degraded redundant metadata (DRuM) service 600, and manipulate the data structures. An operating system 225, portions of which are typically resident in memory 220 (in-core) and executed by the processing elements (e.g., processor 210), functionally organizes the node by, inter alia, invoking operations in support of the storage service implemented by the node. A suitable operating system 225 may include a general-purpose operating system, such as the UNIX® series or Microsoft Windows® series of operating systems, or an operating system with configurable functionality such as microkernels and embedded kernels. However, in an embodiment described herein, the operating system is illustratively the Linux® operating system. It will be apparent to those skilled in the art that other processing and memory means, including various computer readable media, may be used to store and execute program instructions pertaining to the embodiments herein.

The storage controller 250 cooperates with the storage service 300 implemented on the storage node 200 to access information requested by the client 120. The information is preferably stored on storage devices such as internal solid state drives (SSDs) 270, illustratively embodied as flash storage devices, as well as SSDs of external storage array 150 (i.e., an additional storage array attached to the node). In an embodiment, the flash storage devices may be block-oriented devices (i.e., drives accessed as blocks) based on NAND flash components, e.g., single-level-cell (SLC) flash, multi-level cell (MLC) flash, triple-level cell (TLC) flash, or quad-level cell (QLC) flash and the like although it will be understood to those skilled in the art that other block-oriented, non-volatile, solid-state electronic devices (e.g., drives based on storage class memory components) may be advantageously used with the embodiments described herein. The storage controller 250 may include one or more ports having I/O interface circuitry that couples to the SSDs 270 over an I/O interconnect arrangement, such as a conventional serial attached SCSI (SAS), serial ATA (SATA), and non-volatile memory express (NVMe) PCI topology.

The cluster interface 260 may include one or more ports adapted to couple the storage node 200 to the other node(s) of the cluster 100. In an embodiment, dual 10 Gbps Ethernet ports may be used for internode communication, although it will be apparent to those skilled in the art that other types of protocols and interconnects may be utilized within the embodiments described herein. The NVRAM 230 may include a back-up battery or other built-in last-state retention capability (e.g., non-volatile semiconductor memory such as storage class memory) that is capable of maintaining data in light of a failure to the storage node and cluster environment.

Storage Service

Figure 3A:
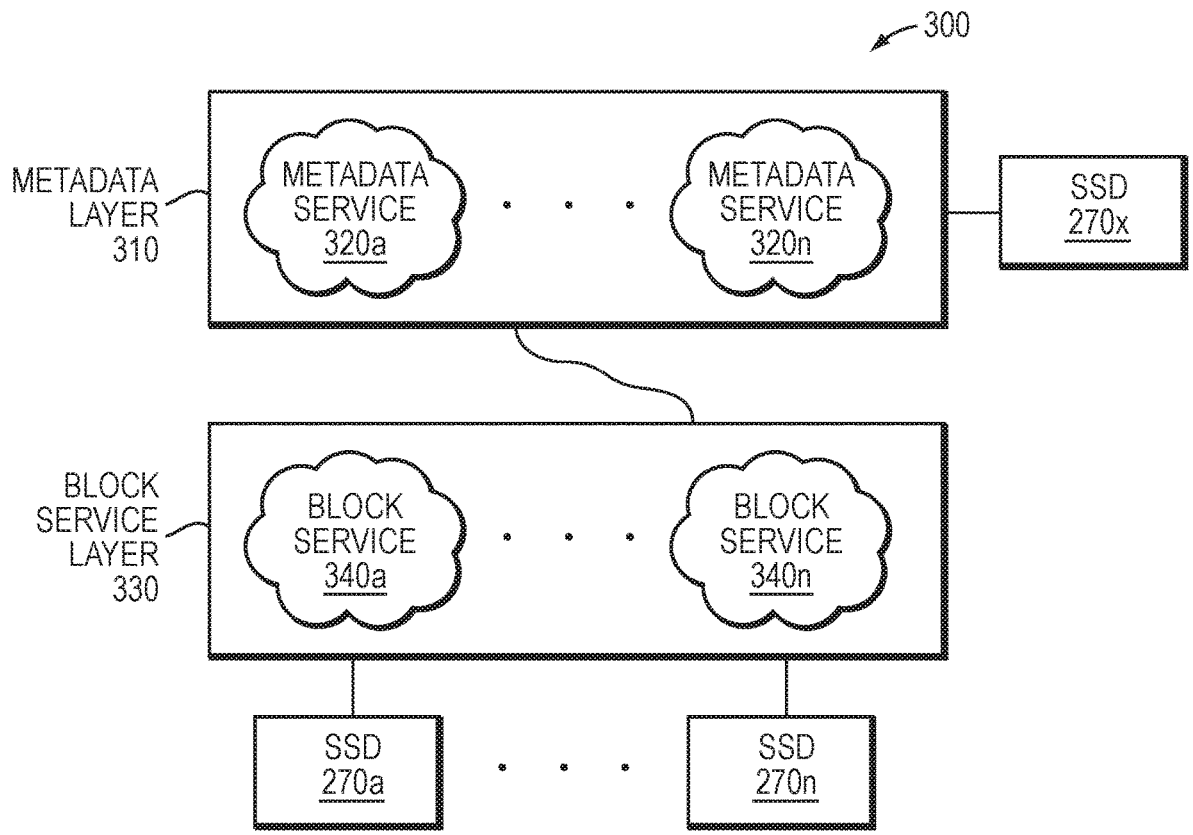
FIG. 3A is a block diagram of a storage service of the storage node.

FIG. 3A is a block diagram of the storage service 300 implemented by each storage node 200 of the storage cluster 100. The storage service 300 is illustratively organized as one or more software modules or layers that cooperate with other functional components of the nodes 200 to provide the distributed storage architecture of the cluster 100. In an embodiment, the distributed storage architecture aggregates and virtualizes the components (e.g., network, memory, and compute resources) to present an abstraction of a single storage system having a large pool of storage, i.e., all storage, including internal SSDs 270 and external storage arrays 150 of the nodes 200 for the entire cluster 100. In other words, the architecture consolidates storage throughout the cluster to enable storage of the LUNs, each of which may be apportioned into one or more logical volumes ("volumes") having a logical block size of either 4096 bytes (4 KB) or 512 bytes. Each volume may be further configured with properties such as size (storage capacity) and performance settings (quality of service), as well as access control, and may be thereafter accessible (i.e., exported) as a block storage pool to the clients, preferably via iSCSI and/or FCP. Both storage capacity and performance may then be subsequently "scaled out" by growing (adding) network, memory and compute resources of the nodes 200 to the cluster 100.

Each client 120 may issue packets as input/output (I/O) requests, i.e., storage requests, to access data of a volume served by a storage node 200, wherein a storage request may include data for storage on the volume (i.e., a write request) or data for retrieval from the volume (i.e., a read request), as well as client addressing in the form of a logical block address (LBA) or index into the volume based on the logical block size of the volume and a length. The client addressing may be embodied as metadata, which is separated from data within the distributed storage architecture, such that each node in the cluster may store the metadata and data on different storage devices (e.g., data on SSDs 270a-n and metadata on SSD 270x) of the storage coupled to the node. To that end, the storage service 300 implemented in each node 200 includes a metadata layer 310 having one or more metadata services 320a-n configured to process and store the metadata, e.g., on SSD 270x, and a block server layer 330 having one or more block services 340a-n configured to process and store the data, e.g., on the SSDs 270a-n. For example, the metadata services 320a-n map between client addressing (e.g., LBA indexes) used by the clients to access the data on a volume and block addressing (e.g., block identifiers) used by the block services 340a-n to store and/or retrieve the data on the volume, e.g., of the SSDs.

Figure 3B:
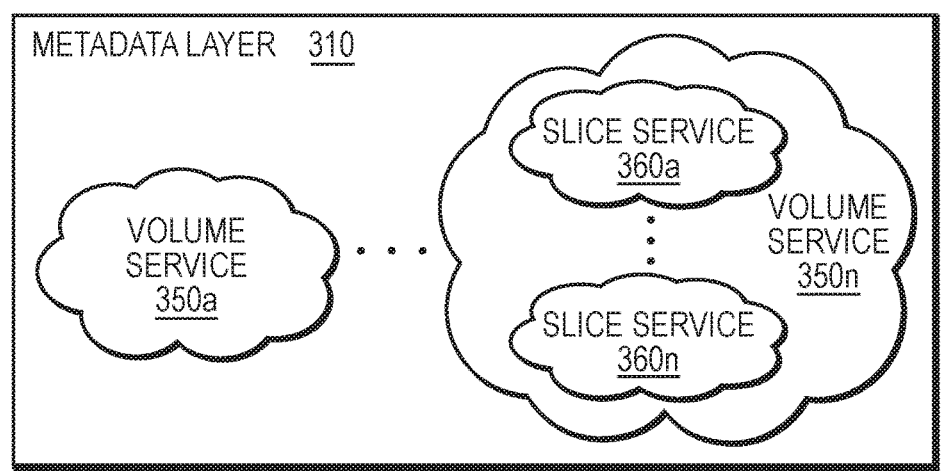
FIG. 3B is a block diagram of an exemplary embodiment of the storage service.

FIG. 3B is a block diagram of an alternative embodiment of the storage service 300. When issuing storage requests to the storage nodes, clients 120 typically connect to volumes (e.g., via indexes or LBAs) exported by the nodes. To provide an efficient implementation, the metadata layer 310 may be alternatively organized as one or more volume services 350a-n, wherein each volume service 350 may perform the functions of a metadata service 320 but at the granularity of a volume, i.e., process and store the metadata for the volume. However, the metadata for the volume may be too large for a single volume service 350 to process and store; accordingly, multiple slice services 360a-n may be associated with each volume service 350. The metadata for the volume may thus be divided into slices and a slice of metadata may be stored and processed on each slice service 360. In response to a storage request for a volume, a volume service 350 determines which slice service 360a-n contains the metadata for that volume and forwards the request to the appropriate slice service 360.

Figure 4:
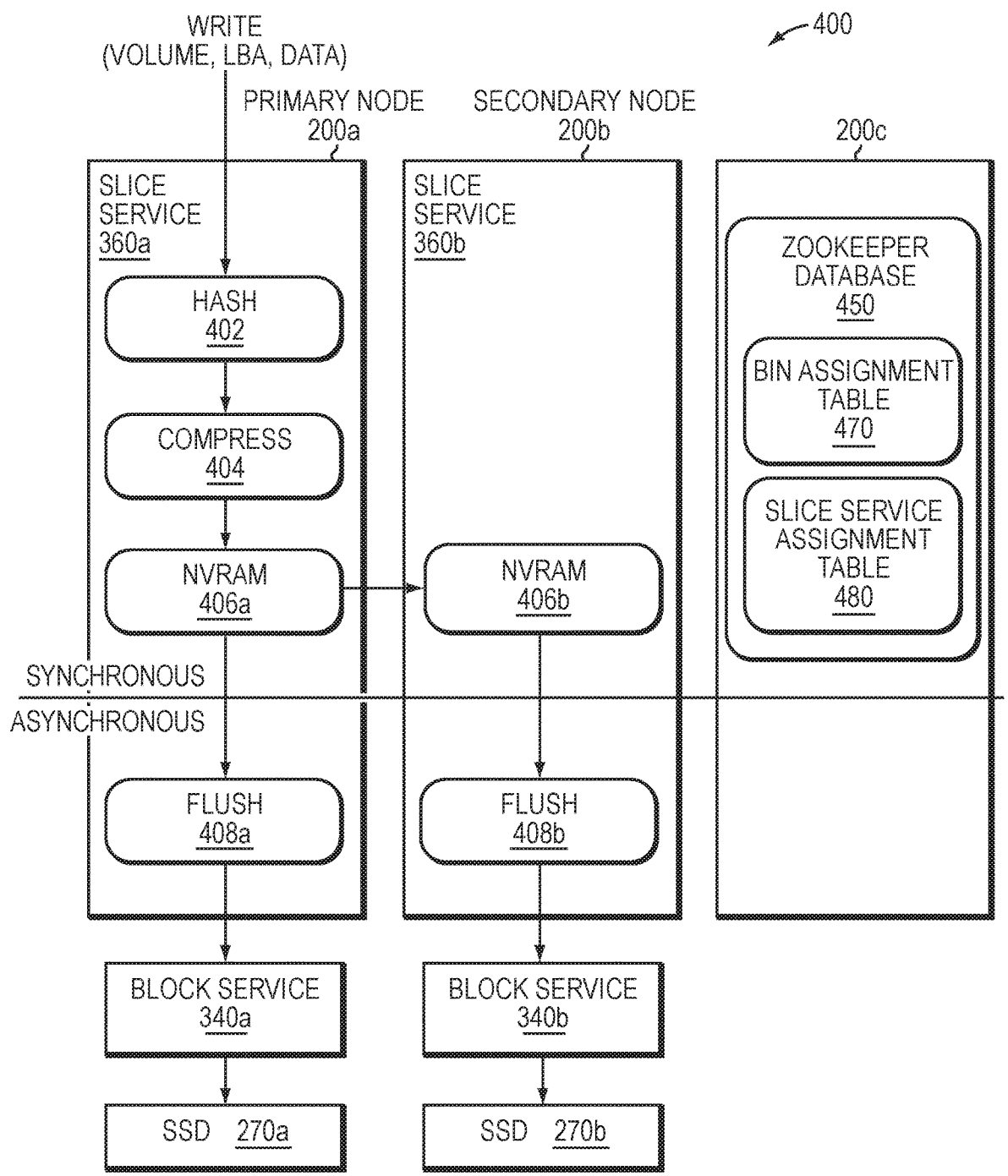
FIG. 4 illustrates a write path of the storage node.

FIG. 4 illustrates a write path 400 of a storage node 200 for storing data on a volume of storage. In an embodiment, an exemplary write request issued by a client 120 and received at a storage node 200 (e.g., primary node 200a) of the cluster 100 may have the following form:

write (volume, LBA, data)

wherein the volume specifies the logical volume to be written, the LBA is the logical block address to be written, and the data is the actual data to be written. Illustratively, the data received by a slice service 360a of the primary node 200a is divided into 4 KB block sizes. At box 402, each 4 KB data block is hashed using a conventional cryptographic hash function to generate a 128-bit (16B) hash value (recorded as a block identifier of the data block); illustratively, the block ID is used to address (locate) the data on the internal SSDs 270 as well as the external storage array 150. A block ID is thus an identifier of a data block that is generated based on the content of the data block. The conventional cryptographic hash function, e.g., Skein algorithm, provides a satisfactory random distribution of bits within the 16B hash value/block ID employed by the technique. At box 404, the data block is compressed using a conventional, e.g., LZW (Lempel-Zif-Welch), compression algorithm and, at box 406a, the compressed data block is stored in NVRAM. Note that, in an embodiment, the NVRAM 230 is embodied as a write cache. Each compressed data block is then synchronously replicated to the NVRAM 230 of one or more additional storage nodes (e.g., secondary node 200b) in the cluster 100 for data protection (box 406b). An acknowledgement is returned to the client when the data block has been safely and persistently stored in the NVRAM of the multiple storage nodes 200a,b of the cluster 100.

Figure 5:
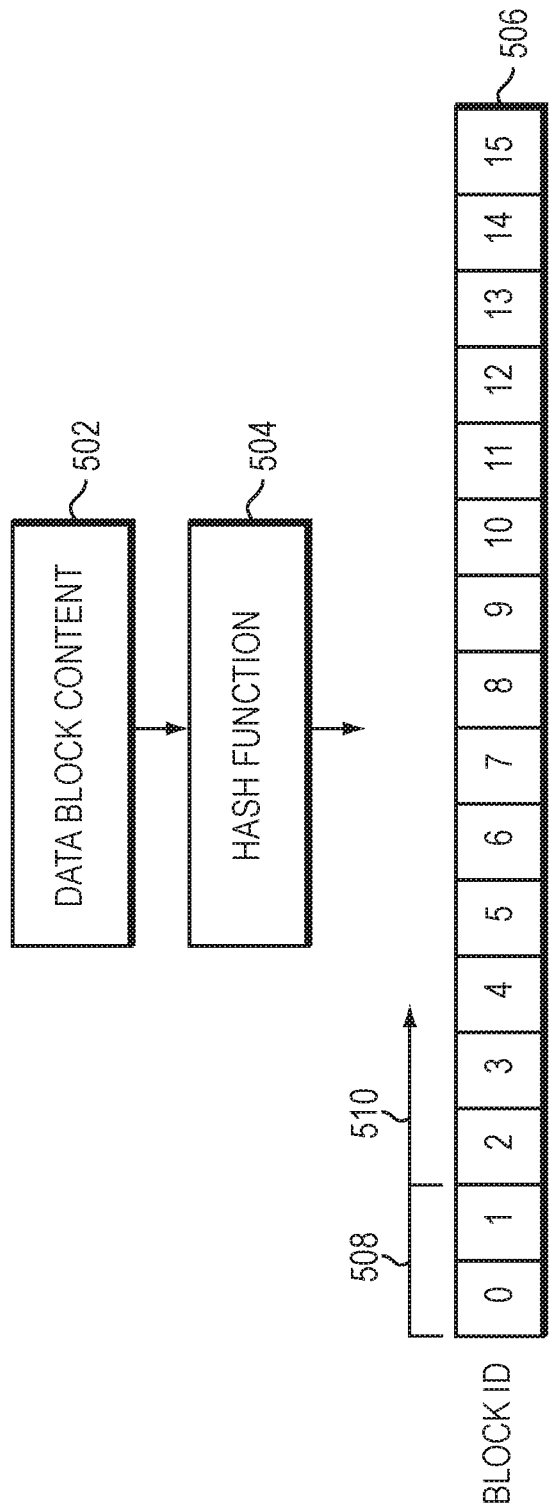
FIG. 5 is a block diagram illustrating details of a block identifier.

FIG. 5 is a block diagram illustrating details of a block identifier. In an embodiment, content 502 for a data block is received by storage service 300. As described above, the received data is divided into data blocks having content 502 that may be processed using hash function 504 to determine block identifiers (IDs). That is, the data is divided into 4 KB data blocks, and each data block is hashed to generate a 16B hash value recorded as a block ID 506 of the data block; illustratively, the block ID 506 is used to locate the data on one or more storage devices. The data is illustratively organized within bins that are maintained by a block service 340a-n for storage on the storage devices. A bin may be derived from the block ID for storage of a corresponding data block by extracting a predefined number of bits from the block ID 506.

In an embodiment, the bin may be divided into buckets or "sublists" by extending the predefined number of bits extracted from the block ID. For example, a bin field 508 of the block ID may contain the first two (e.g., most significant) bytes (2B) of the block ID 506 used to generate a bin number (identifier) between 0 and 65,535 (depending on the number of 16-bits used) that identifies a bin. The bin identifier may also be used to identify a particular block service 340a-n and associated SSD 270. A sublist field 510 may then contain the next byte (1B) of the block ID used to generate a sublist identifier between 0 and 255 (depending on the number of 8 bits used) that identifies a sublist with the bin. Dividing the bin into sublists facilitates, inter alia, network transfer (or syncing) of data among block services in the event of a failure or crash of a storage node. The number of bits used for the sublist identifier may be set to an initial value, and then adjusted later as desired. Each block service 340a-n maintains a mapping between the block ID and a location of the data block on its associated storage device/SSD, i.e., block service drive (BSD).

Illustratively, the block ID (hash value) may be used to distribute the data blocks among bins in an evenly balanced (distributed) arrangement according to capacity of the SSDs, wherein the balanced arrangement is based on "coupling" between the SSDs, i.e., each node/SSD shares approximately the same number of bins with any other node/SSD that is not in a same failure domain, i.e., protection domain, of the cluster. As a result, the data blocks are distributed across the nodes of the cluster based on content (i.e., content driven distribution of data blocks). This is advantageous for rebuilding data in the event of a failure (i.e., rebuilds) so that all SSDs perform approximately the same amount of work (e.g., reading/writing data) to enable fast and efficient rebuild by distributing the work equally among all the SSDs of the storage nodes of the cluster. In an embodiment, each block service maintains a mapping of block ID to data block location on storage devices (e.g., internal SSDs 270 and external storage array 150) coupled to the node.

Illustratively, bin assignments may be stored in a distributed key-value store across the cluster. Referring again to FIG. 4, the distributed key-value storage may be embodied as, e.g., a "zookeeper" database 450 configured to provide a distributed, shared-nothing (i.e., no single point of contention and failure) database used to store bin assignments (e.g., a bin assignment table) and configuration information that is consistent across all nodes of the cluster. In an embodiment, one or more nodes 200c has a service/process associated with the zookeeper database 450 that is configured to maintain the bin assignments (i.e., mappings) in connection with a data structure, e.g., bin assignment table 470. Illustratively the distributed zookeeper is resident on up to, e.g., five (5) selected nodes in the cluster, wherein all other nodes connect to one of the selected nodes to obtain the bin assignment information. Thus, these selected "zookeeper" nodes have replicated zookeeper database images distributed among different failure domains of nodes in the cluster so that there is no single point of failure of the zookeeper database. In other words, other nodes issue zookeeper requests to their nearest zookeeper database image (zookeeper node) to obtain current bin assignments, which may then be cached at the nodes to improve access times.

For each data block received and stored in NVRAM 230, the slice services 360a,b compute a corresponding bin number and consult the bin assignment table 470 to identify the SSDs 270a,b to which the data block is written. At boxes 408a,b, the slice services 360a,b of the nodes 200a,b then issue store requests to asynchronously flush copies of the compressed data block to the block services 340a,b associated with the identified SSDs 270a,b. An exemplary store request issued by each slice service 360a,b and received at each block service 340a,b may have the following form:

store (block ID, compressed data)

The block services 340a,b confirm receipt of the flushed data block copies to thereby assume "ownership" of the data. The block service 340a,b for each SSD 270a,b also determines if it has previously stored a copy of the data block. If not, the block service 340a,b stores the compressed data block associated with the block ID on the SSD 270a,b. Note that the block storage pool of aggregated SSDs is organized by content of the block ID (rather than when data was written or from where it originated) thereby providing a "content addressable" distributed storage architecture of the cluster. Such a content-addressable architecture facilitates deduplication of data "automatically" at the SSD level (i.e., for "free"), except for at least two copies of each data block stored on at least two SSDs of the cluster. In other words, the distributed storage architecture utilizes a single replication of data with inline deduplication of further copies of the data, i.e., there are at least two copies of data for redundancy purposes in the event of a hardware failure.

DRuM Service

The embodiments described herein are directed to a degraded redundant metadata (DRuM) technique configured to maintain multiple (e.g., two) copies of data for storage nodes of a cluster, e.g., during upgrade of a storage node, to ensure continuous protection of the data served by the nodes. The data is logically organized as one or more volumes on storage devices of the cluster and includes metadata that describe the data of each volume. As stated previously, nodes of the cluster provide slice services that present client facing tasks that initially store the data and metadata for eventual synchronization to the back-end block services (i.e., data at rest) also hosted on the nodes. The cluster may be configured to maintain primary and secondary slice services such that the secondary slice service includes a copy of the initial data and, thus, can failover in the event that the primary slice service is unavailable. Illustratively, a data protection system (DPS) may be configured to maintain two copies (first and second copies) of the data in the cluster during upgrade (or other unavailability) of a storage node that is assigned to store one of the copies of the data but that is taken offline during the upgrade. As a result, an original slice service (SS), e.g., the secondary SS, of the secondary node may become unavailable during the upgrade. Accordingly, failover of the remaining SS, e.g., the primary SS, becomes impossible, leaving initially stored data vulnerable to loss. In response to the unavailability of the original SS, the technique redirects replicated data targeted to the original SS to a standby SS in accordance with the DRuM service of the cluster. Note that unavailability of the primary SS may result in promotion of the secondary SS as the primary SS.

Figure 6:
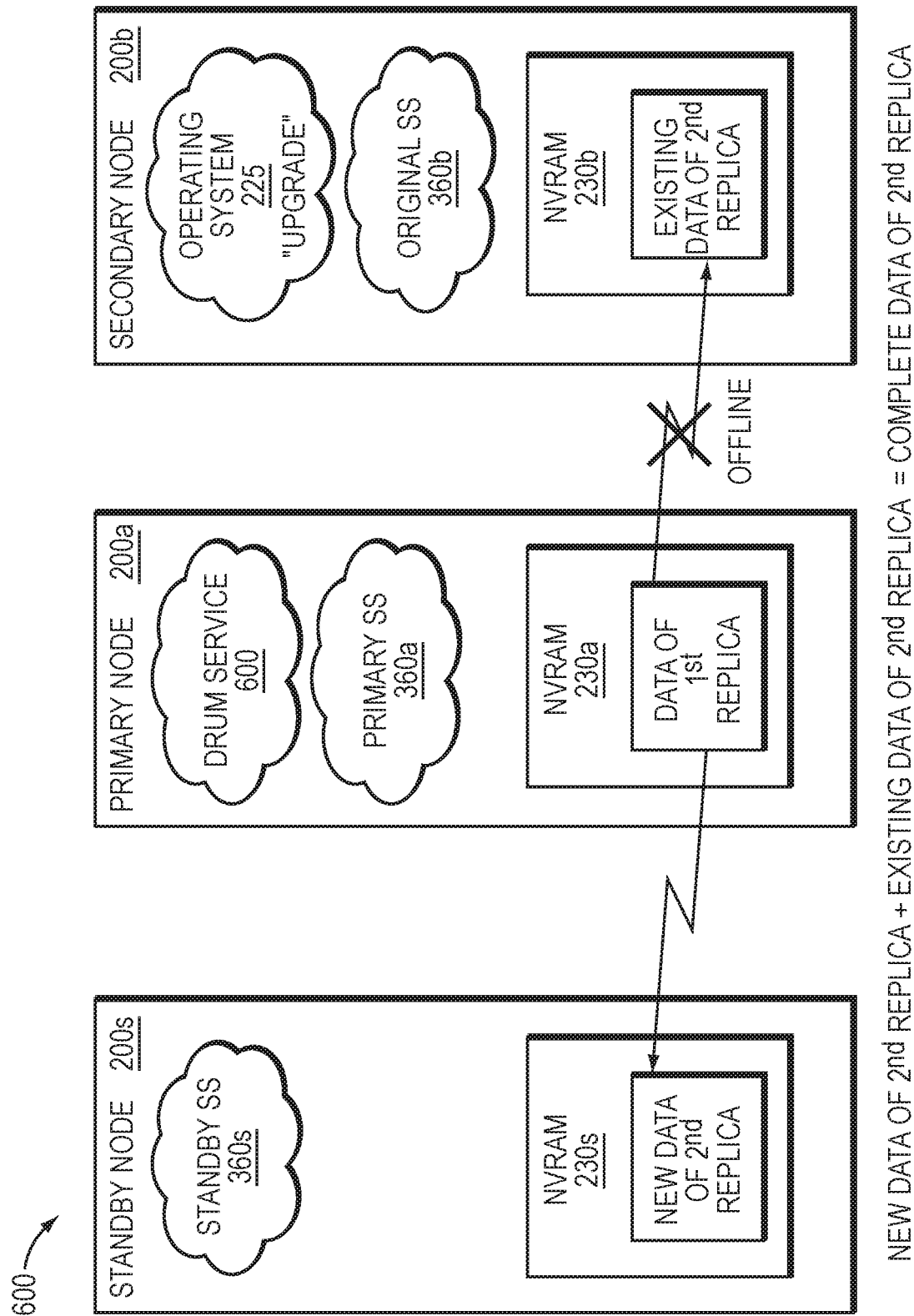
FIG. 6 illustrates an example workflow for maintaining protection of data during upgrade of a storage node in the cluster.

FIG. 6 illustrates an example workflow for maintaining protection of data during upgrade (or other unavailability) of a storage node in the cluster in accordance with the DRuM technique. Assume an upgrade to the operating system 225 is being performed on a storage node 200, such as secondary node 200b. The secondary node 200b is taken offline such that substantially all services of the node are unavailable. Therefore, the secondary node 200b cannot store new data or serve its hosted data, which includes both (block) data and metadata during the upgrade. The technique described herein is directed to slice services (SS) 360 of the nodes 200 and, in particular, to (block) data that is maintained by the SS 360 but not yet flushed to block services (BS) 340 as well as metadata that describes the block data (hereinafter collectively "data"). The data maintained by the primary SS is particularly vulnerable during upgrade and similar outages of the secondary SS, because transfer of ownership of the data from the primary SS is not effective until flushing of its block data has been confirmed on multiple (e.g., two) BSs. In contrast, a BS with permanent or transient faults may not be problematic during such upgrade outages because transfer of ownership of the flushed data cannot be confirmed (nor even accepted) by a faulty BS. As such, vulnerability of the SS during upgrades extends to servicing of both metadata and block data that the SS maintains (owns) because it hasn't (or cannot) transfer ownership to the BSs.

Illustratively, a SS 360 (e.g., primary SS 360a and original SS 360b acting as a secondary SS) executes on each storage node 200 in the cluster and the DRuM technique chooses another SS to use as a standby SS 360s of a volume. The standby SS 360s is an alternative SS that may be "spun up" (initialized) to temporarily maintain data redundancy in the cluster. In an embodiment, a standby SS 360s is assigned (i.e., a node 200s is assigned as candidate for the standby SS to be started when necessary) for every original SS, a priori, and is always available in the cluster until needed, at which time incoming data (destined to the offline SS of a node being upgraded) is forwarded to the standby SS. Note that the original SS 360b may have been initially designated as the primary SS and the "current" primary SS 360a may have been initially designated as the secondary SS which was promoted to become the current primary SS when the original SS 360a became unavailable. An SS assignment algorithm is employed that assigns original primary and secondary SSs 360a,b on primary and secondary nodes 200a,b, respectively, as well as standby SSs 360s on standby nodes 200s, to one or more volumes. The assignments are illustratively based on criteria such as, e.g., storage capacity of a node, size of a volume (slice), minimum quality of service (QoS) parameter settings, etc.

Notably, the DRuM technique is directed primarily to an original secondary SS 360b of a secondary node 200b that is brought offline for upgrade or similar outages; however the technique does contemplate an original primary SS 360a of a primary node 200a being brought offline and an original secondary SS being promoted as primary SS. For least disruption of slice service failure, an upgrade (i.e., planned or expected outage) is thus generally directed to a secondary SS 360b. Note that the technique applies equally to unplanned outages (e.g., node failures) in which case failover to the secondary SS then promoted to primary SS is performed first. Thereafter, when the original primary SS is brought back online, the roles may be reversed. Illustratively, an update algorithm of the DRuM service 600 ensures that a primary SS 360a is available and that only a secondary SS is updated.

The primary node/primary SS assignments are exported to the clients 120 (e.g., iSCSI initiators) to enable the clients to directly connect and communicate with (e.g., write data to) the appropriate node (primary node 200a) of the cluster. As described above with respect to FIG. 4, data written by a client 120 to the primary node 200a transcends the write path 400 of the primary node 200a, where data is hashed 402, compressed 404 and stored on the NVRAM 406a of the primary node as data of a first ($1^{st}$) copy. The data is then replicated to the secondary node 200b, e.g., as data of a second ($2^{nd}$) copy) in accordance with a SS assignment data structure, i.e., a slice service (SS) assignment table 480, of the zookeeper database 450. The secondary SS 360b on the secondary node 200b also accesses the zookeeper assignments to determine that the data is a replicated write and thus stores the replicated data in the NVRAM 230b on the secondary node. The secondary SS 360b then acknowledges persistent storage of the data to the primary SS 360a on the primary node 200a. The primary node, in turn, acknowledges back to the client 120 that the write has been persistently stored. Flushing of the data to the block services 340a,b may subsequently occur as a background operation.

In the write path 400 of the primary node 200a, the primary SS 360a replicates the write data to the secondary SS 360b up to the point when the secondary SS 360b becomes offline during, e.g., an upgrade. Software (logic) of the DRuM service 600 on the primary node 200a detects that the secondary SS 360b of the secondary node 200b is offline by, e.g., examining the SS assignment table 480 of the zookeeper database 450 (e.g., a state of a zookeeper session from the secondary SS 360b becomes closed). Note that at the start of an upgrade (update), the node to be upgraded is identified and, if necessary, the role of that node (e.g., if primary) is switched to secondary to ensure that the DRuM technique is invoked as described herein. In essence, when one of the multiple (e.g., two) original primary/secondary SSs is taken off line for an upgrade, the DRuM service 600 detects that the node/SS is unavailable and replicates newly received incoming data by writing (forwarding) that data to the standby SS 360s. To that end, the DRuM service 600 of primary node 200a resends any "inflight" replicated write data (copy) that has not been acknowledged by the secondary SS (hereinafter "original SS 360b") to the assigned standby SS 360s along with any new write data of the $2^{nd}$ copy. Forwarding of data to the standby SS 360s continues until the original SS 360b is subsequently brought back online (e.g., the upgrade completes) and may resume its original role.

In an embodiment, the standby SS 360s receives no data until the upgrade, at which time it receives only new incoming (write) data of the $2^{nd}$ copy forwarded by the primary node 200a after the original (secondary) SS 360b is unavailable, e.g., brought offline. Note that the data received by the standby SS 360s is not the entire copy ($2^{nd}$ copy) of data for the volume, but rather only the new incoming write data of the $2^{nd}$ copy after the original SS 360b becomes offline, e.g., as a result of a failure or upgrade. This new incoming data of the $2^{nd}$ copy is essentially combined with (added to) the existing data of the $2^{nd}$ copy maintained by the original (secondary) SS 360b in order to form a complete, valid $2^{nd}$ copy of the data. That is, the data received by the standby SS 360s includes only new incoming portions of the replicated (i.e., $2^{nd}$ copy) data received at the cluster during downtime of the storage node being upgraded. Accordingly, ordering of the data is significant as is the union of the existing copy portion of the data stored at the original (secondary) SS 360b and the new incoming copy portion of the data stored at the standby SS 360s.

Advantageously, the DRuM technique ensures that there are multiple, e.g., two, full (complete) copies of data at all times (i.e., initial store of data by the SSs and data at rest in the BSs) in accordance with the DPS, despite the fact that portions of those copies may be distributed across multiple, e.g., two, storage nodes. The DRuM technique allows rebuilding of the data from the distributed portions with no data loss to thereby ensure that at least one complete copy of the data is useable at any given time. Note that in the event a primary SS fails during upgrade of an original (secondary) SS so that no primary or secondary SS is available, a "data unavailability" state is entered because the standby SS cannot serve the data by itself (no complete copy). Service of the data may then be suspended until either (i) the primary SS comes back online or (ii) the secondary SS being upgraded and the standby SS are online and functional, e.g., through manual administrative configuration.

The foregoing description has been directed to specific embodiments. It will be apparent, however, that other variations and modifications may be made to the described embodiments, with the attainment of some or all of their advantages. For instance, it is expressly contemplated that the components and/or elements described herein can be implemented as software encoded on a tangible (non-transitory) computer-readable medium (e.g., disks, electronic memory, and/or CDs) having program instructions executing on a computer, hardware, firmware, or a combination thereof. Accordingly this description is to be taken only by way of example and not to otherwise limit the scope of the embodiments herein. Therefore, it is the object of the appended claims to cover all such variations and modifications as come within the true spirit and scope of the embodiments herein.

What is claimed is:

1. A method comprising:
    maintaining first and second copies of data on first and second slice services of respective first and second storage nodes of a plurality of nodes of a cluster, the first slice service receiving a first write request having existing data from a client;
    in response to receiving the write request, copying the existing data from the first slice service to the second slice service;
    in response to copying the existing data, acknowledging receiving the first write request to the client;
    in response to an unavailability of the second slice service, redirecting new incoming data of a second write request received at the first slice service to a standby slice service of a standby node in the cluster without replicating the data copied to the second slice service prior to the unavailability; and
    synchronizing the existing data to a block service of the storage nodes such that ownership of the existing data is transferred to the block service.

2. The method of claim 1 wherein the second slice is a primary slice service and the first slice service is a secondary slice service promoted to the primary slice service in response to the unavailability of the second slice service.

3. The method of claim 1 wherein the unavailability of the second slice service results from an update to the second node.

4. The method of claim 1 further comprising combining the new incoming data with the existing data maintained by the second slice service to form a complete copy of the data.

5. The method of claim 1 wherein the standby slice service comprises an alternative slice service that is initialized to temporarily maintain data redundancy in the cluster.

6. The method of claim 1 wherein the standby slice service is assigned a priori and is available in the cluster until needed.

7. The method of claim 1 further comprising:
employing a slice service assignment algorithm that assigns the first and second slice services to the first and second nodes, respectively, as well as the standby slice service on the standby node, to one or more volumes of the cluster.

8. The method of claim 7 wherein the assignments are based on one or more criteria such as storage capacity of a node, size of a volume, and minimum quality of service (QoS) parameter settings.

9. The method of claim 1 further comprising:
in response to the second slice service subsequently becoming available, synchronizing the new incoming data to the second slice service from the first slice service.

10. The method of claim 1, wherein the synchronizing of the existing data and new incoming data is performed as background process on the first node.

11. A system comprising:
a cluster of storage nodes, each storage node having a processor coupled to a network interface, wherein the processor of a first and second storage node are configured to:
maintain first and second copies of data on first and second slice services of the respective first and second storage nodes of a cluster, the first slice service receiving a first write request having existing data from a client;
in response to receiving the write request, copy the existing data from the first slice service to the second slice service;
in response to copying the existing data, acknowledge receiving the first write request to the client;
in response to an unavailability of the second slice service, redirect new incoming data of a second write request received at the first slice service to a standby slice service of a standby node in the cluster without replicating the data copied to the second slice service prior to the unavailability; and
synchronizing the existing data to a block service of storage nodes such that ownership of the existing data is transferred to the block service.

12. The system of claim 11 wherein the second slice is a primary slice service and the first slice service is a secondary slice service promoted to the primary slice service in response to the unavailability of the second slice service.

13. The system of claim 11 wherein the unavailability of the second slice s service results from an update to the second node.

14. The system of claim 11 wherein the processor of the first and second storage nodes are further configured to continue redirection of new incoming data to the standby slice service until the second slice service becomes available again.

15. The system of claim 11 wherein the standby slice service comprises an alternative slice service that is initialized to temporarily maintain data redundancy in the cluster.

16. The system of claim 11 wherein the standby slice service is assigned a priori and is available in the cluster until needed.

17. The system of claim 11 where the processor of the first storage node is configured to copy the existing data from the first slice service to the second slice service, and is further configured to resend any data copied from the first slice service that has not been acknowledged by the secondary slice service to the standby slice service.

18. The system of claim 11 wherein the redirected new incoming data is copied to a non-volatile random access memory of the standby node.

19. A non-transitory computer readable medium containing executable program instructions to:
maintain first and second copies of data on first and second slice services of respective first and second storage nodes of a cluster, the first slice service receiving a first write request having existing data from a client;
in response to receiving the write request, copy the existing data from the first slice service to the second slice service;
in response to copying the existing data, acknowledge receiving the first write request to the client;
in response to an unavailability of the second slice service, redirect new incoming data of a second write request received at the first slice service to a standby slice service of a standby node in the cluster without replicating the data copied to the second slice service prior to the unavailability; and
synchronize the existing data to a block service of the storage nodes such that ownership of the existing data is transferred to the block service.

20. The method of claim 1, further comprising:
copying the redirected new incoming data to a non-volatile random access memory of the standby node.

\* \* \* \* \*